(12) United States Patent
Thiers et al.

(10) Patent No.: US 8,500,230 B2
(45) Date of Patent: Aug. 6, 2013

(54) METHOD FOR MANUFACTURING A LAMINATE PRODUCT, LAMINATE PRODUCTS OBTAINED THEREBY AND DEVICE FOR REALIZING THE METHOD

(75) Inventors: Bernard Thiers, Eine (BE); Laurent Meersseman, Kortrijk (BE)

(73) Assignee: Flooring Industries Limited, SARL, Bertrange (LU)

( * ) Notice: Subject to any disclaimer, the term of this patent is extended or adjusted under 35 U.S.C. 154(b) by 115 days.

(21) Appl. No.: 12/999,703

(22) PCT Filed: May 29, 2009

(86) PCT No.: PCT/IB2009/052265
§ 371 (c)(1),
(2), (4) Date: Dec. 17, 2010

(87) PCT Pub. No.: WO2009/153680
PCT Pub. Date: Dec. 23, 2009

(65) Prior Publication Data
US 2011/0120634 A1    May 26, 2011

(30) Foreign Application Priority Data
Jun. 19, 2008    (BE) .................................. 2008/0339

(51) Int. Cl.
*B41J 29/393*    (2006.01)

(52) U.S. Cl.
USPC .............. 347/14; 101/484; 427/258; 427/267

(58) Field of Classification Search
USPC ... 101/484; 427/261–263, 267–268; 156/277; 347/14, 156
See application file for complete search history.

(56) References Cited

U.S. PATENT DOCUMENTS

| | | | |
|---|---|---|---|
| 3,650,821 A * | 3/1972 | Meiser | 162/166 |
| 6,499,822 B1 * | 12/2002 | Abe et al. | 347/19 |
| 6,888,147 B1 * | 5/2005 | Hansson et al. | 250/453.11 |
| 2007/0144375 A1 * | 6/2007 | Jeschonneck et al. | 101/248 |
| 2009/0139170 A1 * | 6/2009 | Thiers | 52/309.1 |
| 2010/0212852 A1 * | 8/2010 | Mitchell et al. | 162/164.1 |

FOREIGN PATENT DOCUMENTS

| | | | |
|---|---|---|---|
| BE | 1016846 A3 * | 8/2007 | |
| DE | 199 63 084 A1 | 6/2001 | |
| DE | 101 56 956 A1 | 6/2003 | |

(Continued)

OTHER PUBLICATIONS

International Search Report and Written Opinion in PCT/IB2009/052265, May 11, 2010.

(Continued)

*Primary Examiner* — Katarzyna Wyrozebski Lee
*Assistant Examiner* — Scott W Dodds
(74) *Attorney, Agent, or Firm* — Workman Nydegger (57) ABSTRACT

Method for manufacturing a laminate product comprising at least a laminate layer with a decor sheet, wherein, for forming the laminate layer, at least a decor sheet is formed by providing in a decor application process a decor in the form of a motif on a decor carrier, wherein this decor carrier consists of a continuous material web, wherein the decor is applied by means of one or more digital printers and wherein the global decor during the processing of the material web is controlled in a varying manner, by means of controlling the one or more printers, as a function of varying external data.

11 Claims, 7 Drawing Sheets

FOREIGN PATENT DOCUMENTS

| | | |
|---|---|---|
| DE | 10 2004 054 764 A1 | 6/2005 |
| EP | 0 021 588 A1 | 1/1981 |
| EP | 0 095 046 A1 | 11/1983 |
| WO | 97/47834 A1 | 12/1997 |
| WO | WO2006/136949 A2 * | 12/2006 |

OTHER PUBLICATIONS

Search Report of EPO regarding Belgium Patent Application No. 2008/0339, Feb. 13, 2009.

* cited by examiner

METHOD FOR MANUFACTURING A LAMINATE PRODUCT, LAMINATE PRODUCTS OBTAINED THEREBY AND DEVICE FOR REALIZING THE METHOD

BACKGROUND OF THE INVENTION

1. Field of the Invention

This invention relates to a method for manufacturing a laminate product, as well as to laminate products which are obtained in accordance with this method, and to a device for realizing the method.

2. Related Art

In particular, the invention relates to a method for manufacturing a laminate product comprising at least a laminate layer, wherein, for forming the laminate layer, on the one hand, at least a decor sheet is formed by providing in a decor application process a decor in the form of a motif on a decor carrier and, on the other hand, subsequently providing the decor sheet with resin by means of a resin application process.

According to the invention, by a laminate product each product has to be understood which consists at least of a laminate layer, which as such comprises at least a decor sheet formed of a decor carrier upon which a decor in the form of a motif is applied and wherein this decor sheet is provided with an amount of resin, more particularly is soaked in resin and/or is impregnated with resin.

According to the invention, such "laminate product" thus can relate to said laminate layer as such, whether or not in hardened condition, as well as any other product comprising such laminate layer. By the last-mentioned other products, substantially products are intended which principally consist of a substrate covered with such laminate layer, whether or not combined with still other layers.

Herein, an important application range are laminate panels, in the first place laminate floor panels, however, in the second place also laminate panels for other purposes, such as for furniture, partition walls and the like. Of course, this may also relate to other products than panels, such as, for example, profiles, skirting boards and such, which comprise a covering of such laminate layer. Further, such products as such may also consist of a composed layer structure in which such laminate layer is incorporated, such as a so-called HPL (High Pressure Laminate) or a compact laminate, of which the laminate layer realized according to the invention then forms part.

It is known to realize a laminate product comprising at least a laminate layer by forming, in order to form the laminate layer, at least, on the one hand, a decor sheet by providing in a decor application process a decor in the form of a motif on a decor carrier and, on the other hand, by providing the decor sheet with resin by means of a resin application process.

Traditionally, the decor sheet is produced by printing a paper web with a decor. This printing is performed at a printer's, wherein this traditionally is performed by means of rotary printing. The printed decor determines the appearance of the decorative side of the final product. For example, for being applied in floor panels, the decor mostly represents an imitation of wood or stone, amongst which, in the latter case, natural stone as well as other kinds of stone, such as ceramics, concrete or the like may be understood by stone. In the case of an imitation of stone tiles, also cement grout lines or the like may be imitated in the decor.

The decor sheet is provided with an amount of resin by impregnating it with resin, either by immersing it in liquid resin, or by depositing resin thereon or by a combination thereof, after which the resin is dried. Traditionally, this is a step which is performed at the manufacturer of the actual laminate product, for example, at the manufacturer of the laminate floor panels, wherein the decor sheet, more particularly the printed paper web, is provided with resin in a continuous process and the drying is performed by guiding this paper width through one or more drying ovens.

Further, various techniques are known for attaching such laminate layer to a substrate. According to the much applied technique of so-called direct pressure laminate (DPL), the resin-impregnated decor sheet, or at least a portion thereof, is brought onto the substrate, possibly together with other layers, and the whole is consolidated by compressing it at a high temperature, which usually is performed in a heated press. Other layers, which herein may be pressed at the same time, are, for example, a so-called overlay and/or an underlying layer. The overlay mostly is formed from a resin-treated paper layer, in which wear-resistant particles incorporated, such as corundum or the like, and is provided over the decor in order to increase the wear resistance of the finally obtained floor panels. The paper layer of the overlay is of such nature that, after pressing and consolidating, it becomes almost completely transparent. According to a variant, it is also possible to work without an overlay and to apply wear-resistant particles in the resin present at the decor sheet instead. Said facultative underlying layer is a uniformly colored paper layer or the like, which can be provided between the substrate and the decor sheet and which, for example, prevents that color differences in the surface of the substrate would show through in the decorative side.

When pressing the whole, it is customary that also a balancing backing layer is provided at the underside of the substrate.

According to another known technique, namely, the technique of so-called high pressure laminate (HPL), the printed and resin-provided decor sheet first is consolidated with still other material sheets, preferably also impregnated paper webs or sheets, such that an as such relatively stable multi-layered laminate is obtained, which thereafter in its turn can be attached to a substrate, for example, by means of an adhesive.

According to another known technique, the printed and resin-provided decor sheet is pressed together with a plurality of other impregnated material layers, such that a self-supporting laminate structure is obtained, mostly in the form of a thin board, wherein the then obtained product is called "compact laminate", which then mostly is applied without a substrate.

In the case of floor, furniture or wall panels, for said substrate mostly use is made of wood-based board material, mostly MDF (Medium Density Fiberboard) or HDF (High Density Fiberboard), however, other materials may also be applied.

A disadvantage with the known methods for forming a laminate product is that there is little interaction possible between, on the one hand, printing the decor sheet and, on the other hand, resin-treating the decor sheet; in other words, between the decor application process and the resin application process, in particular in that printing is performed at a printer's who supplies the resin-untreated decor sheet to the producers of the laminate, which last-mentioned producers then provide it with resin. This, however, results in that a relatively large buffer stock of printed decor sheet, more particularly, rolls of decor paper, will have to be stocked at the laminate producer's, in view of the fact that the latter must be sure of always having all motifs at hand. Another disadvantage is that when unexpectedly a decor with a certain motif should not be in stock, it takes a certain time until it can be supplied by the printer. Another disadvantage is that the laminate producer often has to store two stocks of decor sheets, more particularly decor paper, namely un-resinated decor sheet and resinated decor sheet.

Further, it is known that, when pressing the decor sheet impregnated with resin for hardening the resin, which mostly is performed when consolidating this decor sheet with the substrate or with other material sheets, a relief can be formed in the surface, more particularly in the form of impressions. Such impressions can be provided in accordance with the printed decor, which in English is called "registered embossed". In the case of an imitation of wood, the impressions may imitate, for example, a natural relief of wood, in the form of impressions representing the pores and the like, in accordance with the printed wood motif. Also, joints between different planks represented by the decor and removed wood portions can be imitated by means of the impressions. In the case of an imitation of stone, also the natural relief of a stone species can be imitated in accordance with the printed decor, and/or impressions can be formed for representing lower-situated cement grout lines and the like.

Normally, the impressions are formed by making use of a press plate provided with a relief.

A difficulty when forming laminate with a relief intended to be in accordance with the decor consists in being able to realize such accordance in reality and with no or minor deviations over the entire surface of the decor sheet. In fact, the resin is provided on the decor sheet in liquid condition, as a result of which the wet decor sheet becomes sensitive to stretching and consequently is stretched during the resin application process.

It is known to take a certain stretching to be expected into account and thus to print the pattern on a somewhat smaller predetermined format than finally desired, in such a manner that the stretched motif obtained after resin application and drying then shows dimensions more or less corresponding to the desired dimensions. Due to the fact that the stretching in fact depends on a large number of parameters, a number of which also can be altered when processing one and the same decor carrier, it is often not sufficient to take a predetermined stretching into account, and often the relief pattern will not be in accordance with the printed pattern. Therefore, the decorative side of the obtained laminate products can show a deformed image.

A solution which can be applied in certain applications consists in designing two or three press plates having a similar relief pattern, however, the patterns of which mutually show a somewhat more stretched format, such that in function of the stretch pertaining to a certain production batch of decor carriers, the best-matching press plate can be applied. However, this technique is particularly expensive and provides only a limited solution. In fact, the technique does not allow taking alterations into account which can occur in a decor carrier itself, as, once a choice of press plate has been made, the entire decor carrier or batch of decor carriers is processed with the chosen press plate. Further, the chosen relief pattern mostly will not fully correspond to the printed pattern.

Further, it is known that in the length direction of the decor carrier, a small regulation of the stretching is possible by altering the tension force with which the decor carrier is fed through the resin application process. However, this regulation is limited and does not offer a solution for deformations in width direction.

SUMMARY OF THE DISCLOSURE

According to a first aspect, the present invention aims at a method for manufacturing laminate products, wherein one or more of the aforementioned disadvantages are excluded or are minimized. Generally, here it aims at a method allowing a generally smoother progress of the production process.

More particularly, in accordance with certain preferred embodiments, the invention also aims at a method allowing an interaction between the decor application process, thus, printing, and the resin application process, and more particularly a technique with which the deformation in a decor as a result of stretching can take place in a controlled manner.

To this aim, according to a first aspect it relates to a method for manufacturing a laminate product comprising at least a laminate layer, wherein, for forming the laminate layer, on the one hand, at least a decor sheet is formed by providing in a decor application process a decor in the form of a motif on the decor carrier, and, on the other hand, subsequently providing the decor sheet with resin by means of a resin application process, with the characteristic that said decor application process and said resin application process are performed in-line with each other.

By "in-line", it is meant that the decor application process and the resin application process are performed simultaneously on a decor carrier originating form the same production batch of decor carrier material, and such in the same production line. By a production line, herein an arrangement is understood wherein a decor carrier is printed with a decor, and the obtained decor sheet, whether or not already divided into individual sheets, subsequently is systematically provided with resin. In other words, there is no intermediary stock of decor sheet from which afterwards decor sheet with a desired motif can be chosen at wish, but the decor carrier is supplied to the resin application process by means of a continuous production stream after the decor is applied. The continuous production stream does not exclude that a buffer stock is formed in between. The decor application process and the resin application process do not necessarily have to be realized in the same processing equipment line or production hall, although this is preferred.

More particularly, it is preferred that in the production direction a length of decor sheet, either in the form of a continuous web or in the form of loose sheets, whether or not stacked, is present between the decor application process and the start of the actual resin application process, which length is less than 100 meters and still better less than 20 meters.

The term decor sheet is to be interpreted in a broad sense, such that by this a continuous printed web must be understood as well as individual sheets, which have been cut to a certain length and are treated one after the other.

It is clear that according to the invention, according to said first aspect thereof, the advantage of a smooth production manner is obtained.

More particularly, in this manner it is possible to switch smoothly from one motif to another. Also, the necessity of large stocks of decor sheet with various motifs is excluded.

The in-line arrangement also enables an interaction.

According to an important preferred embodiment of the invention, which is applied with methods where, as aforementioned, a deformation in the decor carrier occurs as a result of the resin application process, more particularly, stretching occurs in the decor carrier, the method further has the characteristic that the decor application process is performed in a controlled manner and that the decor thereby is provided on said decor carrier in function of said deformation. Such control has the advantage that the decor, at the moment of its application, can be altered such in respect to dimension, shape and location, that, so to speak, a compensation effect for an undesired deformation is created. In other words, this means that, when printing a motif, a certain deformation which is observed will be taken into account, and that the motif then is printed with such a shape and dimensions that, after deformation, a desired motif, thus, with desired shape and dimensions, is obtained.

Preferably, thus, when applying the decor, a certain continuity in the dimension and/or location of this decor, in the form as obtained after passing through the resin application process, is striven for. More particularly, for the dimensions and/or location of the decor, or of motif parts thereof, as obtained after the resin application, a predetermined value of the dimension or predetermined locations are striven for.

The method, wherein a final decor of a certain dimension is striven for, is of particular importance for laminate products which are provided with a predetermined relief pattern at their surface, which pattern is intended to be in accordance with the decor, which technique is known under the denomination "registered embossed". During the decor application process, the decor then can be applied such in function of the occurring deformation, that this decor, as obtained after deformation, is adapted to said predetermined relief pattern and preferably corresponds or approximately corresponds to the relief pattern.

In the most preferred embodiment, according to the invention use is made of a feedback, wherein the dimensions and/or the location of the decor, or of parts thereof, in other words, motif parts, after the resin application are detected and wherein the decor application process is controlled in function thereof. In this manner, it is possible to intervene correctively at the tiniest deviation that occurs.

It is clear that the detection herein may take place in any manner. For example, the entire width of the decor can be measured after the resin has dried, such that the stretching can be deviated therefrom, and in function of the difference between the measured value and a desired value, an adaptation of the decor to be printed can be provided. According to an alternative, it is also possible to perform a detection and control at multiple locations over the width in order to also take into account possible differences in stretching occurring over the width of the decor sheet.

It is noted that said detection can be performed at various locations in the resin application process. In the most preferred embodiment, the detection takes place after drying the resin, because after this little or no deformation of the decor will occur.

However, the preceding does not exclude that the detection may also be performed earlier. In the case, for example, that the resin is dried in two or more steps, such detection can take place in between these steps. When it is detected then that the deformation substantially occurs prior to the second drying step, the deformation after detection, for example, can be neglected. When possibly a still relatively considerable deformation occurs after detection, this can be accounted for, for example, by means of a correction factor applied on the values obtained by means of the detection and/or by an extrapolation performed on the detected values. In an analogous manner, it is also not excluded to perform the detection even earlier in the resin application process, for example, in wet condition before drying, after a certain stretching has occurred already.

It is evident that also in two or more successive locations detections and measurements can be performed, for example, in the form of an early detection prior to drying, which allows a quick intervention by means of the feedback, and, on the other hand, a later detection, for example, after drying, in order to monitor how stretching further manifests itself.

Preferably, when applying the decor, at least the deformation in width direction will be taken into account, and said feedback then takes place on the basis of detections and measurements which are performed in width direction. By width direction, here the direction has to be understood which is situated perpendicular to the direction in which the decor sheet is guided through the resin application process.

According to another possibility, when applying the decor, at least the deformation in length direction is taken into account. According to the invention, this can be realized by controlling the decor application process in such a manner that the finally obtained motif fulfills the desired dimensions. According to a variant, this can also be realized by varying the tension force in the decor sheet in wet resinated condition.

In a preferred embodiment, when applying the decor, the deformation in length direction as well as in width direction will be taken into account, and an appropriate control is provided which provides for that the final decor, more particularly the motif thereof, meets the desired dimensions. It is clear that in this manner a possible parallelogram-shaped deformation, which might occur without any control, also can be compensated.

It is clear that the necessary detections and measurements can be performed in any manner. Herein, one can work with marks which have been provided in the decor and/or at the edge thereof for this purpose. It is also possible to measure the decor itself. To this aim, optical sensors and/or cameras with image recognition can be applied in a known manner.

Further, it is also clear that by the feedback, the dimensions of the measured stretched motif are compared to desired dimensions and, when a deviation exists, a correction will be realized during printing.

In the most preferred embodiment, a printing unit shall be used for applying the decor, which unit allows instantaneously controlling the printed motif. For realizing this, it is preferred that a digitally controlled printing device is applied, wherein the control of the decor application process then provides for an alteration in the printed motif. In practice, to this aim an inkjet printer or a printing unit operating according to the inkjet principle can be applied. Herein, printer with a to and fro moving printing head as well as so-called single-pass printers can be used.

Performing an alteration in the decor, motif, respectively, can be performed in various manners.

According to a first possibility, the alteration will consist in that the respective motif, or portions thereof, is, are, respectively, printed on the decor carrier in a more or less stretched manner.

According to another possibility, the control of the decor application process will effect at least that, when applying the decor, the mutual location of certain motif parts of this decor is adapted. This means that by the printing device always motif parts with a fixed dimension are printed, however, when stretching is too large, then these motif parts are shifted towards each other, whereas with too little stretching, these are shifted away from each other. This is, amongst others, without any difficulty applicable with floor panels which are realized from a larger laminate board, wherein the motif parts then, for example, each time correspond to the width of a floor panel. The fact that the images, at the transitions between the motif parts, will no longer adjoin or overlap each other, does not pose a problem, as at these locations a saw cut is performed and material is milled away for forming coupling means.

Preferably, the resin application process is accomplished in a resin application line, and the decor application process is also performed in this resin application line.

Normally, the decor shall be provided on the decor carrier prior to performing any resin application in the in-line process. The decor carrier then is still dry and is simple to print.

However, according to the invention it is not excluded to start from a decor carrier already provided with a certain amount of resin, after which, as aforementioned, it is provided with a decor and then again is provided with resin. The advantage thereof is that less stretching will occur. By the term "decor carrier" then according to the first aspect of the invention in such case the pre-resin-treated decor carrier is to be understood, and by the term "resin application process" then exclusively the application of the resin must be understood, which is deposited on the pre-resinated decor carrier after applying the decor.

By the "decor application process", according to the invention a process has to be understood, wherein at least a portion of a decor, and more particularly of the motif, is provided on the decor carrier. When a motif consists, for example, of multiple motif parts printed on top of each other, according to the invention by the term "decor application process" has to be understood applying all motif parts as well as applying only one or a limited number of motif parts.

According to the invention, it is not excluded that the decor carrier, prior to being subjected to the decor application process intended by the invention, already is provided with a print, for example, in the form of a background, a basic portion of a motif or the like.

According to the present invention, the terms "decor sheet" and "decor carrier" have to be interpreted in a broad sense and are not limited to what classically is understood by a decor paper. In the present application, the decor sheet namely is any form of a carrier on which a decor, more particularly motif or motif part, is provided.

In practice, it is preferred that for the decor carrier, it is started from a wound-up material web, which thus forms a roll, wherein this material web is unwound and guided through the resin application line, and that the decor application process takes place along the material web on a location between the roll and the place where the first resin application takes place, or possibly on the roll itself.

Said method of the invention is particularly useful for manufacturing laminate floor panels, wherein the decor sheet is provided directly or indirectly on a substrate, such as a MDF or HDF board, after which the actual laminate panels are formed from the substrate with the decor layer and possibly still other layers provided thereon. As usual, hereby it is started from large boards, which, after having pressed the laminate thereon, are divided into panels and provided with coupling parts at the edges, for example, as known from WO 97/47834.

It is clear that the invention also relates to laminate products manufactured according to the method of the invention, in particular laminate floor panels.

The invention also relates to a device for performing the herein above-described method, with the characteristic that it consists at least of a supply portion for supplying a decor carrier and a resin application line arranged in-line therewith, said line consisting at least of an applicator for providing resin in liquid condition on the decor carrier, and a drying device, characterized in that between said supply portion and the applicator, a printing device for providing the decor on the decor carrier is present.

In a preferred embodiment, the device further is characterized in that said printing device is of the type allowing to adapt the decor in width, in its totality and/or by altering the location of portions thereof; that the device is provided with a measuring device controlling at least certain deformations in the decor, and that it comprises a feedback by which the printing device is controlled in function of values originating from the measuring device.

Further, the invention also aims at a number of methods for manufacturing laminate products, wherein a number of advantageous techniques are applied in the decor application process, which methods are described in the following as the second through fifth aspects of the invention.

According to the second independent aspect, the invention relates to a method for manufacturing a laminate product comprising at least a laminate layer with a decor sheet, wherein, for forming the laminate layer, at least a decor sheet is formed by providing in a decor application process a decor in the form of a motif on a decor carrier, wherein this decor carrier consists of a continuous material web, with the characteristic that the decor is applied by means of one or more digital printers and that the global decor during the processing of the material web is controlled in a varying manner, by controlling the one or more printers, such in function of varying external data. This method is in intended in particular for being applied in mass production printing, which means that a large length of said decor carrier is printed, more particularly at least 100 meters, and preferably an entire roll of such decor carrier, and not a limited amount for particular purposes, such as testing a new decor. By using digital printers in a production printing process, more particularly in mass production printing, an alteration and/or correction can be performed in the middle of processing one and the same material web in a smooth manner. It is also advantageous that controlling by means of external data is possible.

According to a first application possibility of the second aspect, the control is performed in function of the amount of desired decor of a certain motif. This means that in the middle of processing one and the same material web, switching over from the production of one certain motif to another motif is performed. This allows realizing smaller numbers of a certain motif, contrary to classical printing systems operating with printing cylinders, which normally are exchanged only after processing an entire material web.

According to another application possibility of the second aspect, the control is performed in function of incoming technical data of the printed decor carrier, for example, in function of stretching during impregnation, derived from, for example, data originating from the resin treatment of an earlier produced decor carrier originating from the same production batch, for example, decor paper produced from the same paper mass. The alteration or correction then may consist in, for example, printing the motif in a more or less stretched manner in order to compensate said stretching.

According to the third independent aspect, the invention relates to a method for manufacturing a laminate product comprising at least a laminate layer with a decor sheet, wherein, for forming the laminate layer, at least a decor sheet is formed by providing in a decor application process a decor in the form of a motif on a decor carrier, with the characteristic that for the decor carrier, it is started from a pre-fixed paper or pre-fixed material on the basis of paper. This method offers the advantage that the decor carrier is less subject to stretching when moisturized with the resin and thus the decor applied on the pre-fixed paper or on the material on the basis of paper then substantially retains its proper dimensions. According to the invention, a practical form of pre-fixation consists in that the decor carrier, thus, prior to printing, is already partially treated with resin, for example, with a minor amount of resin, and/or is treated with resin on one side only, whereas printing then, for example, is performed on the other side. The partial resin application and, of course, drying provide for that a possible stretching takes place before printing and the decor carrier, when drying, comes into a stable condition.

It is clear that said methods according to the second and third aspects also are particularly advantageous when they are applied for manufacturing laminate products which are provided with impressions which are in accordance with the decor, more particularly laminate products provided with a so-called "registered embossed" surface, wherein it is desirable that the motif has precise final dimensions.

According to the fourth independent aspect, the invention relates to a method for manufacturing a laminate product comprising at least a laminate layer with a decor sheet, wherein the decor sheet is formed by providing in a decor application process a decor in the form of a motif on a decor carrier and wherein the decor carrier is advanced at a certain nominal passage speed, characterized in that the decor carrier therein, during the actual application of the decor, is moved at a local passage speed which is lower than said nominal passage speed, that, during the actual application of the decor, an excess surface is provided with a decor and that the application of the decor is performed in intervals, and in between these intervals each time a local passage at an increased speed larger than the nominal passage speed takes place. Herein, the nominal passage speed is the speed at which the decor carrier is supplied to the process and discharged therefrom. By the fact that an "excess surface is provided with a decor", it is meant that during the actual application of the decor per time unit a larger surface is printed than the surface moved along one and the same place per time unit at said local passage speed.

This method offers the advantage that for applying a decor, one or more printing devices can be used, which as such have a printing speed which is slower than the nominal passage speed, or, in other words, that the passage speed no longer has to be restricted to said printing speed. This offers, amongst others, the possibility of working with digital printers, the printing speed of which is relatively slow, whereas still a higher nominal passage speed can be applied.

According to a preferred embodiment of the fourth aspect, the decor carrier is supplied and discharged at a permanent or approximately permanent speed, and the differences in speed are compensated by means of a buffer action. More particularly, it is preferred that the decor carrier consists of a continuous material web and that the buffer action takes place by guiding the material web before and after the decor application process along buffer systems, by which the path to be taken by the material web systematically is enlarged and shortened. Such buffer action offers a practical solution for compensating speed differences.

According to the fifth independent aspect, the invention relates to a method for manufacturing a laminate product comprising at least a laminate layer with a decor sheet, wherein the decor sheet is formed by providing in a decor application process a decor in the form of a motif on a decor carrier, with the characteristic that in the decor application process, use is made of multiple simultaneously operating digital printing devices, which realize own decor portions situated after each other in the production direction, or, thus, decor segments, on mutually differing surface parts of the decor carrier. During printing, each digital printing device thus covers a certain surface. This method has the advantage that in a relatively short time rather large surfaces can be printed by means of digital printing devices, even when they as such have a limited operational speed.

According to the present invention, the characteristics of two, three, four of even all five of said independent aspects can be mutually combined, wherein it is clear that thereby new advantages are obtained. For example, combining the characteristics of the first and the fourth aspect has the advantage that, on the one hand, digital printers can be used as the printing device, which enables altering the printed decor simply by electronic control, whereas, on the other hand, although such printers operate relatively slow, still a higher passage speed can be applied in the resin application process.

BRIEF DESCRIPTION OF THE DRAWINGS

With the intention of better showing the characteristics of the invention, hereafter, as an example without imitative character, several preferred embodiments are described, with reference to the accompanying figures, wherein.

DETAILED DESCRIPTION OF PREFERRED EMBODIMENTS OF THE INVENTION

Figure 1:
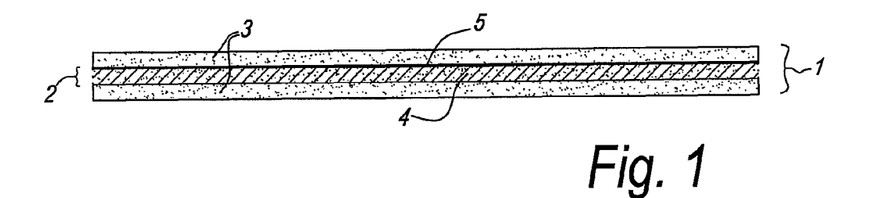
FIG. 1, in cross-section and at an enlarging scale, represents a laminate layer.

In order to illustrate the method for which the invention is intended, in FIG. 1 a laminate layer 1 is represented, which can be realized according to the invention. Herein, the laminate layer 1 consists of a decor sheet 2 provided with resin 3, wherein the decor sheet 2 in its turn at least consists of a decor carrier 4 and a decor 5 in the form of a motif carried by it.

Traditionally, the decor carrier 4 herein consists of a paper layer, whereas the decor 5 is formed by a print provided on the paper layer. However, it is clear that such decor carrier 4 and decor 5 can be build up in any manner and of any suitable material. The applied motif can be of any form. In an important application field of the invention, namely, the production of laminate floor panels, usually a motif will be applied representing wood or stone, such that by means of the installed floor panels, a parquet floor, plank floor and/or tile floor is imitated.

The resin 3 can be applied at one time or in different steps. In FIG. 1, schematically a complete impregnation with resin 3 is depicted, however, it is clear that variants are possible, for example, wherein resin is applied on one side only.

As represented in the schematic representation of FIGS. 2 and 3, the present invention relates to a method for manufacturing a laminate product comprising at least a laminate layer 1, wherein, for forming the laminate layer 1, on the one hand, at least a decor sheet 2 is formed by providing in a decor application process 6 a decor 5 in the form of a motif on a decor carrier 4 and, on the other hand, subsequently providing the decor sheet 2 with resin 3 by means of a resin application process 7.

The particularity of the invention consists in that said decor application process 6 and said resin application process 7 are performed in-line with each other.

In the example, the decor carrier 4 consists of a flexible material sheet, such as a paper web, which is supplied from a stock 8, in this case a roll 9, from which the decor carrier 4 is unwound in the form of a material web. It is clear that the supply 8 is taken up in a suitable frame or the like, which then can be marked as the supply portion.

Applying a decor 5 in the decor application process 6 is performed by means of a printing device 10.

For realizing the resin application process 7, a device 11 is applied, which comprises at least an applicator 12 for applying the resin 3 in moist condition at the decor sheet 2, as well as a drying device 13 for drying the resin 3.

Figure 2:
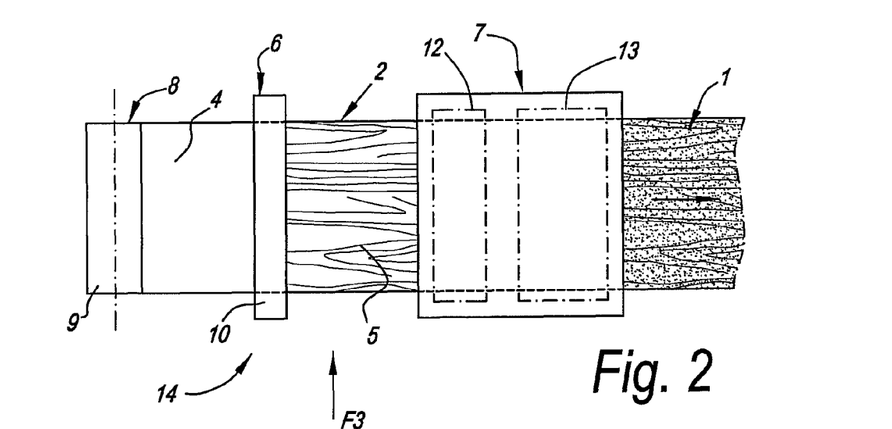
FIG. 2, highly schematized and in top plan view, represents an arrangement applying a method of the invention.
Figure 3:
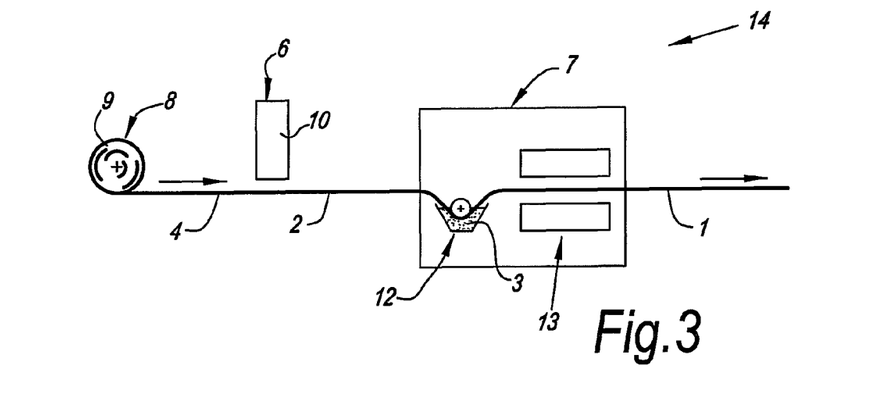
FIG. 3 represents a view according to arrow F3 in FIG. 2.

It is clear that further the necessary transport means are provided for guiding the decor carrier 4 through the entire device 14, which transport means, however, are not depicted in the schematic representation of FIGS. 2 and 3.

In FIG. 3, the applicator 12 is represented only schematically as an impregnation device, wherein the decor layer 2 is guided through the resin 3. However, it is clear that in practice any suitable device can be applied for this purpose. Some examples of techniques for applying resin at a decor sheet are impregnation by immersion, spreading by means of one or more rollers, spraying on of resin, jetting on resin by means of a spraying nozzle and so on. Various of these techniques may be combined with each other.

Of course, the drying device 13 also can be of any construction. In practice, it mostly consists of two drying tunnels arranged one after the other.

Principally, the arrangement of FIGS. 2 and 3 implies that the resin application process is performed in a resin application line, which as such may be of traditional construction, whereas the particularity consists in that in this resin application line the decor application process 6 is realized, too.

It is clear that by performing the aforementioned processes in-line, the advantages described in the introduction are obtained.

Figure 4:
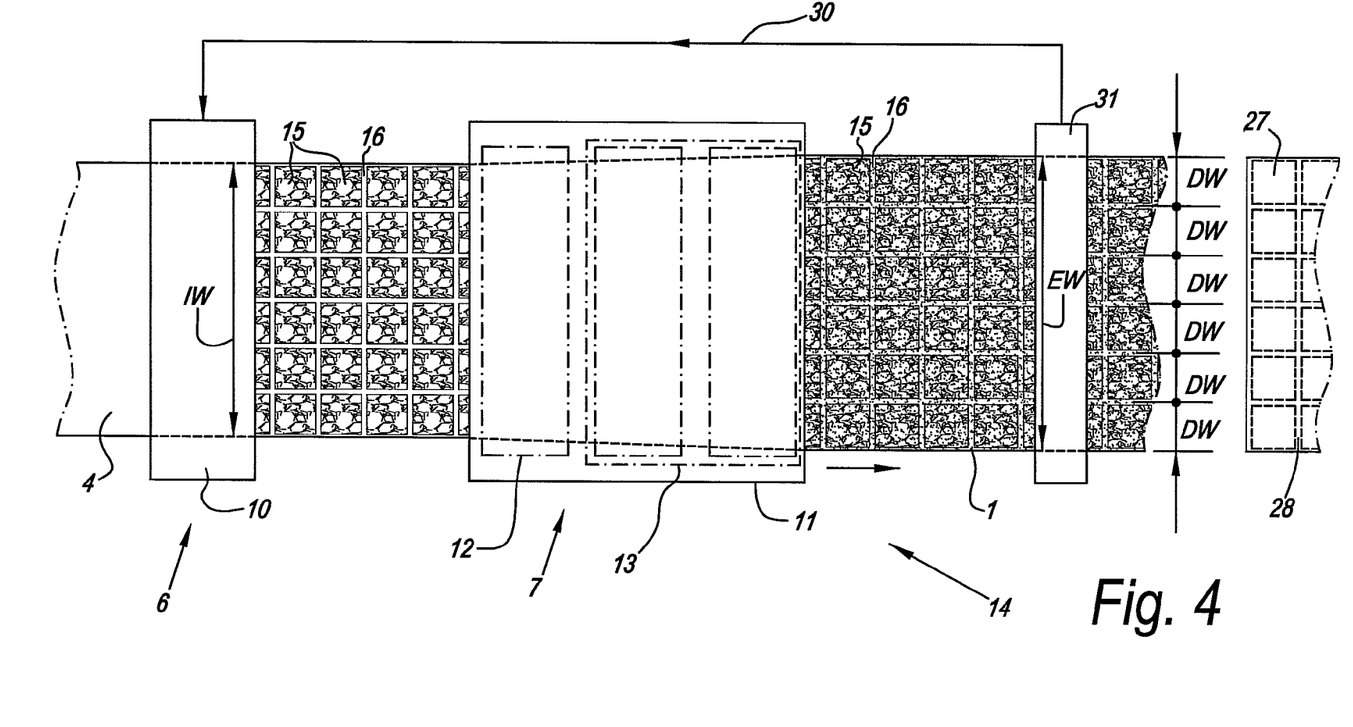
FIG. 4, in top plan view, represents another arrangement applying a method according to the invention, together with a corresponding portion of a press plate, represented schematically next to it.

From practice, it is known that the decor carrier 4 mostly becomes softer due to the contact with the moist resin 3 and, when being transported through the device 14, will stretch in length as well as in width. This then leads to a condition wherein the decor sheet 2 and, thus, also the motif provided thereon will stretch, which is represented in FIG. 4 in an exaggerated manner, wherein the printed decor sheet 2 has an initial width IW and, after the resin application, obtains a final width EW, which is larger. In reality, this relates to a stretching value of mostly only several millimeters, for example, 2 millimeters, over a width of, for example, 2 meters.

As discussed in the introduction, there are various applications where such stretching, even if it only amounts to 2 millimeters, is undesired, or where it is desired that stretching is allowed, however, being under control, such that finally a motif is obtained that meets certain dimensions. This is the case, for example, in the production of laminate products which are provided at their surface with an impressed relief intended to be in accordance with the printed motif, and thus the final motif, thus, after drying of the resin, has to meet very precise dimensions.

The necessity of such precision is discussed in greater detail in the following, with reference to the example illustrated in FIGS. 4 to 8, where the produced motif is a tile motif for laminate floor panels, wherein between the printed tile surfaces 15 also printed grout lines 16, for example, for imitating cement grout lines, are present and wherein it is intended to press the obtained laminate layer 1 on a substrate 17, such that the surface 18 of the pressed laminate product 19 is impressed at the location of the grout lines in order to imitate in this manner deeper situated grout lines with these impressions 20.

Figure 5:
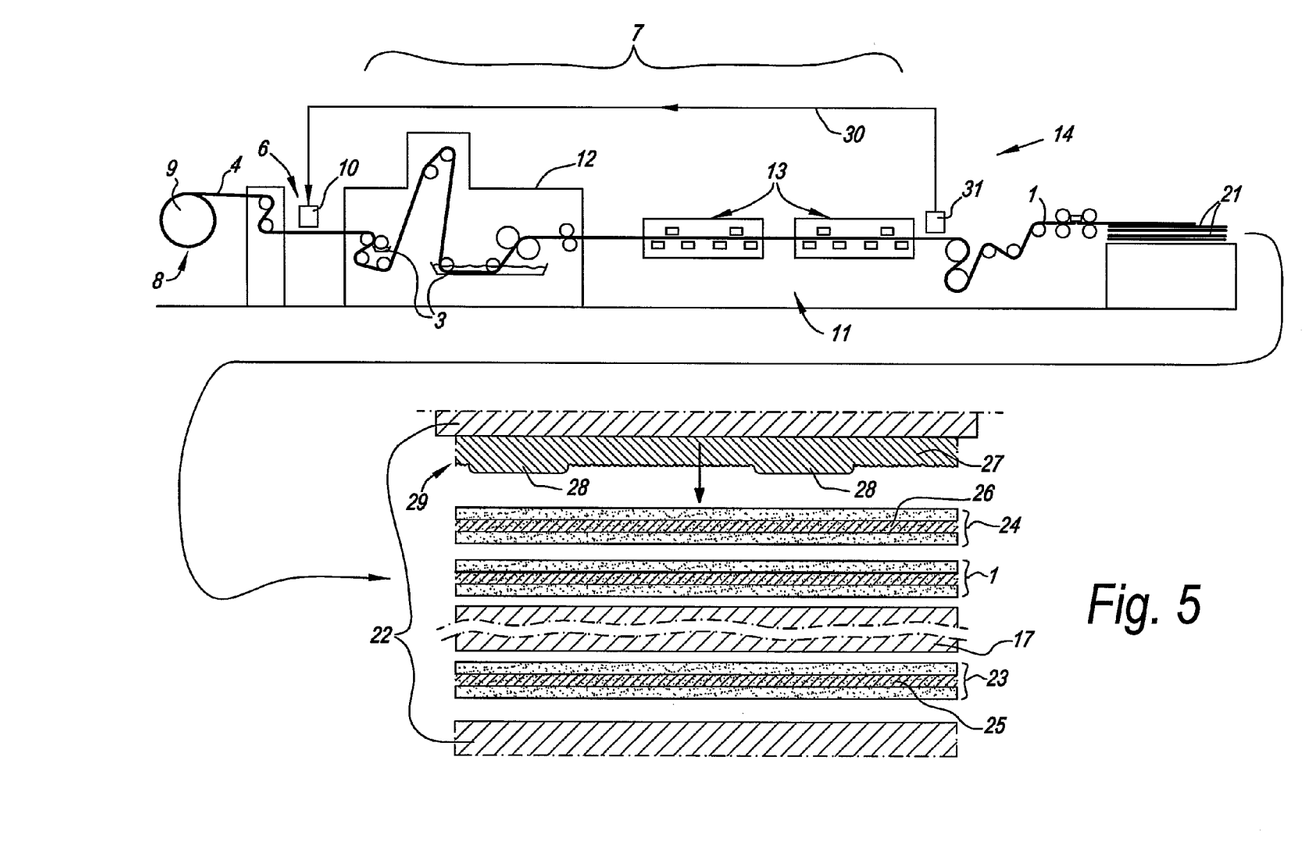
FIG. 5 represents a side view of the arrangement of FIG. 4 in a more detailed view.

FIG. 5 shows the process of FIG. 4 in side view, together with a number of other steps. Analogous to FIGS. 2 and 3, a decor carrier 4, more particularly paper, is unwound from a roll 9 and fed through the device 14 and thereby provided with a decor 5 and with resin 3. At the end of the resin application process, at least in the represented example, the decor sheet provided with resin, here indicated as laminate layer 1, is divided into individual sheets 21, which then in a later step can be pressed on a substrate 17. As also depicted in FIG. 5, such individual sheet 21 then is compressed, together with a substrate 17, in a press 22 in order to be consolidated under heat and pressure. Herein, also other material layers also may or may not be pressed together with it, such as, for example, a backing layer 23, which exerts a balancing effect, as well as a so-called overlay 24, which can comprise wear-resistant particles, which layer in this case, as usual, also consist of resin-impregnated paper layers 25-26.

Figure 6:
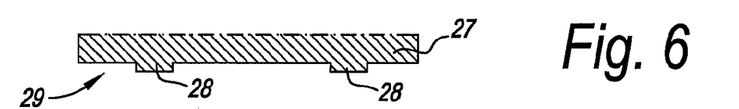
FIGS. 6, 7 and 8 illustrate how impressions can be realized in a laminate surface.
Figure 7:
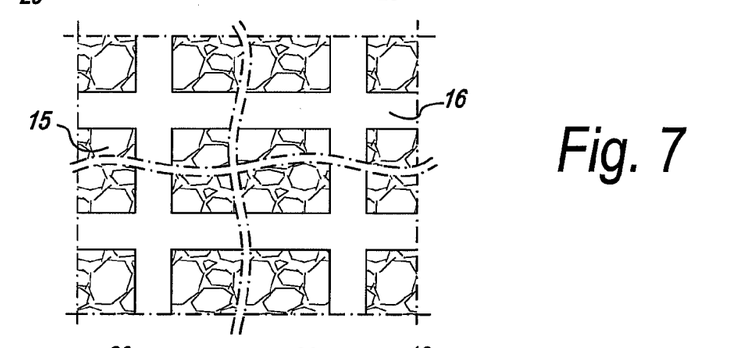
Figure 8:
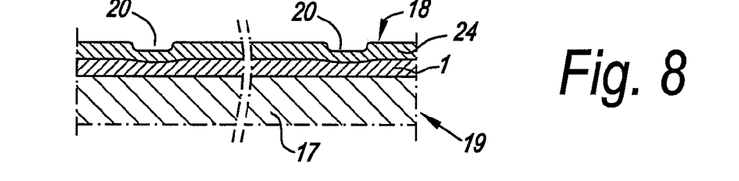

The pressing of the decorative side is performed with the intermediary of a press element which is provided with a relief creating the desired impressions at the surface of the laminate product to be realized. In the represented example, this press element consists of a press plate 27, however, it is clear that any other press element can be applied for forming the impressions, by which, amongst others, also a so-called release foil has to be understood. The successive FIGS. 6, 7 and 8 illustrate the use of such press plate for said tile motif. FIG. 6 shows the press plate 17 in cross-section, whereas FIG. 7 represents a corresponding portion of the decor and FIG. 8 in a corresponding manner shows the pressed laminate product 19, which then possibly has to be cut further to form floor panels. At the press element, in accordance with the grout lines 16 depicted in the decor, protruding portions 28 are provided, the width of which corresponds to the grout lines, such that after pressing, impressions 20 are created on the locations where the printed grout lines 16 are situated.

It is clear that the relief 29 at the press plate 27 has fixed dimensions. Contrary thereto, the motif of the decor in fact may alter in function of said occurring stretching, the value of which never is known with certainty, which thus may result in that the stretched motif is no longer in accordance with the pattern of the relief 29 of the press plate 27.

According to the invention, this is remedied by having the decor application process 6 run in a controlled manner and thereby providing the decor 5 on said decor carrier 4 in function of the respective deformation, whereas, as aforementioned, the decor application process 6 is performed in-line with the resin application process 7. This technique allows that the decor 5 initially, thus, when being applied, can be adapted in function of the stretching, with the consequence that the final result is altered, too. In this manner, a certain continuity in the dimension and/or location of the decor, in the form as obtained after passing through the resin application process 7, can be striven for. More particularly, for the dimensions and/or the location of the decor, or portions thereof, as obtained after the resin application, a predetermined value of the dimension or predetermined location is striven for.

Such adaptation of the decor preferably is performed at least in the direction of the width of the material web, although an adaptation in length, or in both directions, too, is not excluded.

As represented in FIGS. 4 and 5, preferably a feedback 30 is used, wherein the dimensions and/or the location of the decor after the resin application are detected by means of a measuring device 31 and wherein the decor application process 6, or thus the printing device 10, is controlled in function thereof.

In the represented example, the deformation in width direction is taken into account, and the effective decor width is measured by means of the measuring device 31, either by means of the global width, or by means of certain portions of the material web.

The adaptation of the decor in function of the values monitored by the measuring device 31 may be performed in different ways.

Figure 9:
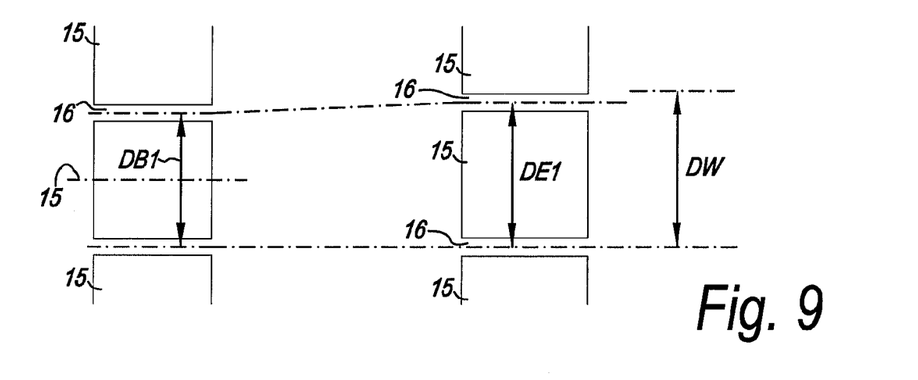
FIGS. 9, 10 and 11 represent how the dimensions of a decor can be adapted.
Figure 10:
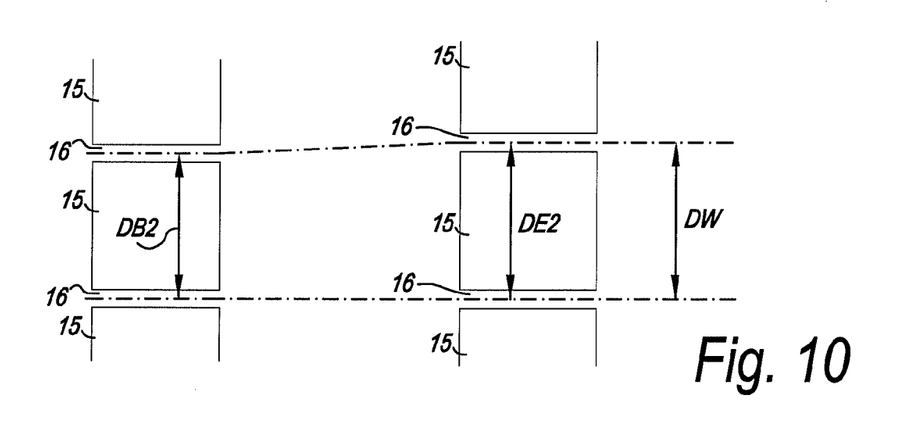

FIGS. 9 and 10 illustrate a first possibility, wherein the adaptation is performed by applying the motif concerned, or portions thereof, on the decor in a more or less stretched manner. These figures show on the left hand side a portion of said tile motif, prior to the resin application, whereas on the right hand side the same portion is represented after the resin application.

FIG. 9 represents a condition wherein the starting dimension, measured between the centers of the grout lines 16, is equal to a value DB1. After applying the wet resin and drying it, this results in a final dimension DE1, which in this case is smaller then a desired predetermined final dimension DW, to which DE2 should correspond. According to the invention, now it is monitored by means of the measuring device 31, how large the deviation between the dimension of the obtained decor and the dimension of the desired decor is. By means of the feedback, the decor then is printed with a larger re-scaled value, with a starting dimension DB2, which is larger than DB1, such that, as represented in FIG. 10, the obtained final dimension DE2 corresponds or approximately corresponds to the desired final dimension DW. It is clear that in this manner always a controlled adaptation of the decor can be provided. The alterations in one material web, in other words, decor carrier, mostly appear gradually, and by means of said feedback, as a result a sufficiently fast intervention is possible in order to keep differences between the dimension of the obtained decor and the desired dimension thereof limited.

As aforementioned, for applying the decor preferably a printing device is applied, which allows to instantaneously control the printed motif. Preferably, use shall be made of one or more digital printers and more particularly of one or more printers operating according to the inkjet principle. The use of a digital printer allows that the printed motif can be re-scaled immediately over the entire surface in a uniform manner, which is impossible, for example, with a printing unit having printing cylinders.

Figure 11:
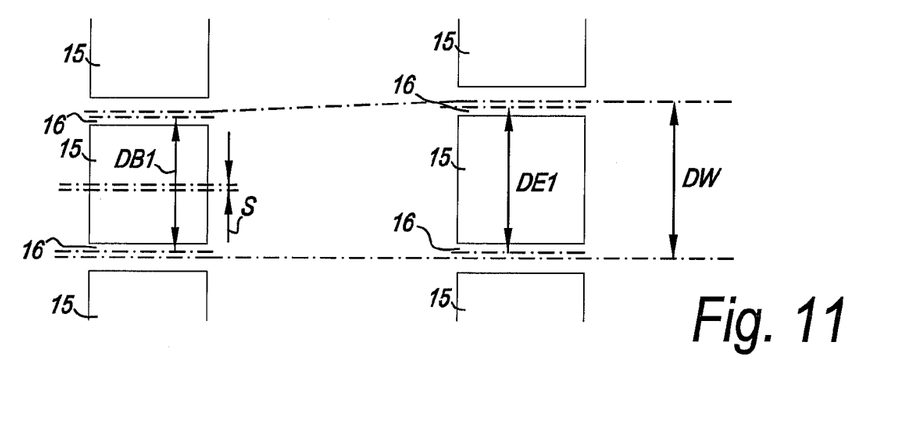

FIG. 11 illustrates another possibility for adapting the decor in function of stretching, wherein the actual decor is not subjected to a uniform, continuously extending re-scaling operation, but the decor is divided into motif portions, which mutually are shifted away from each other to a larger or smaller extent, wherein, in other words, the mutual location of certain motif portions of this decor is adapted.

FIG. 11 is conceived such that it represents a solution for the undesired condition of FIG. 9. In this possibility, a printed motif part has a fixed dimension, which is equal to DB1, wherein this motif part comprises a printed tile surface 15, as well as at the edges a portion of the printed grout lines 16. As aforementioned, FIG. 9 shows a starting condition, wherein the respective motif part, due to the occurring stretching, adopts a final dimension DE1, which is smaller than the predetermined final dimension DW. Herein, it is pointed out that the obtained motif part is not only too small, but also is no longer centered in respect to the place where the stretched motif part ought to be, namely the zone where DW is represented in the figure. According to the solution of FIG. 11, an adaptation is realized by printing the motif part with the same dimension, thus, with a starting dimension DB1, however, shifting this motif part over a distance S, which distance is chosen such that the motif part obtained after stretching, which then has the same final dimension DE1 as in FIG. 1, is situated centered in the zone indicated by DW. It is clear that in this manner differences between a printed motif and a possible relief pattern of a press plate 27 can be reduced to a minimum.

The alteration of the mutual location of the motif parts can be performed in different manners. When, for example, a digital printer is used extending in width over multiple motif parts and, for example, over the entire width of the decor sheet, this printer can be controlled such that the motif parts are printed at a larger or smaller distance away from each other, in function of the measured stretching.

Figure 12:
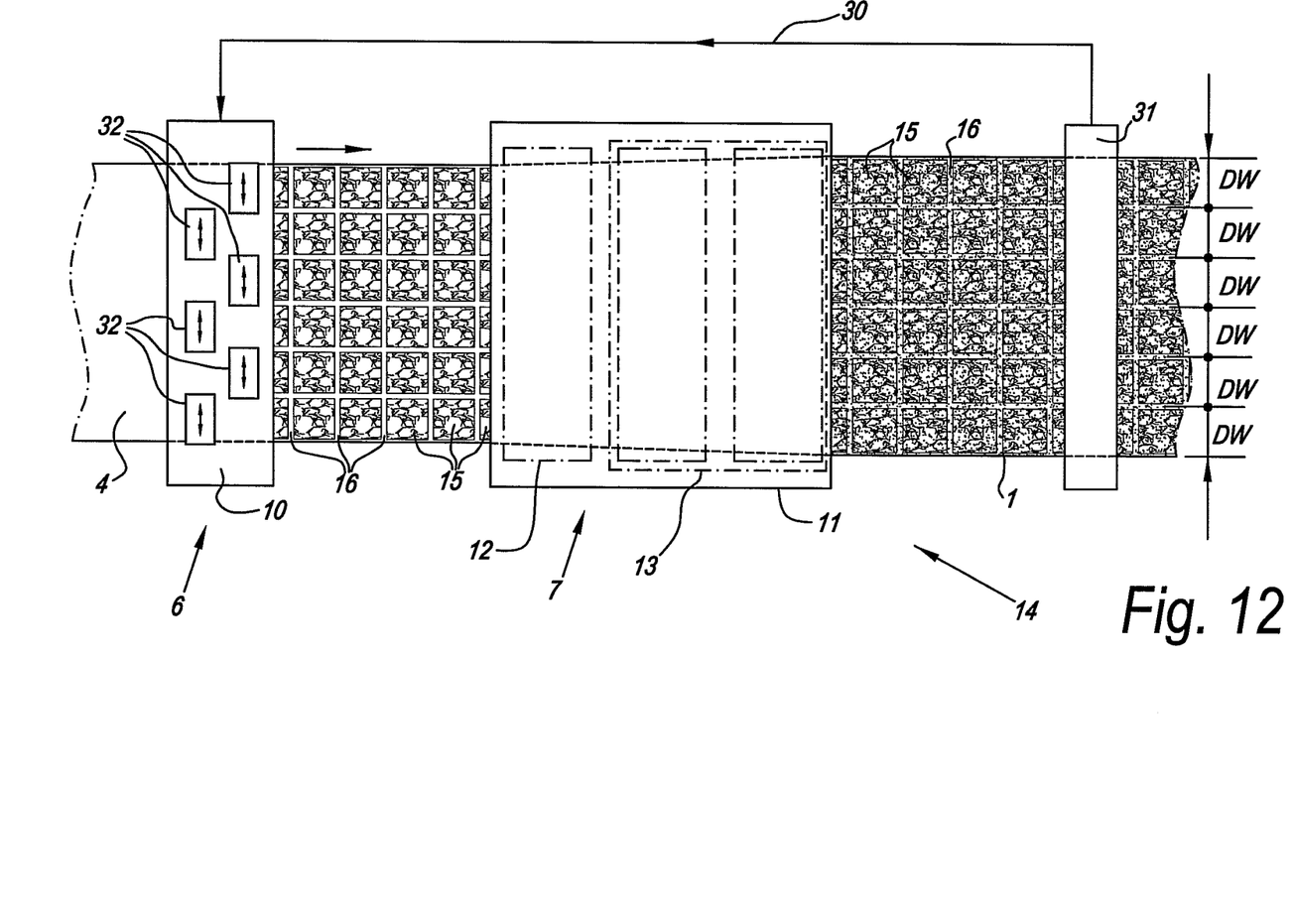
FIG. 12 represents a view similar to that of FIG. 4, however, for a variant.

The division into motif parts also allows working with separate printing units, wherein, in order to realize the aforementioned control, these printing units are displaced in mutual respect. FIG. 12 represents an example thereof, in which the mutually displaceable printing units are indicated schematically by reference number 32. Together, they form a printing device 10.

According to a first possibility, the printing units 32 are controlled such that they are always centered in respect to the place where they have to realize the decor, and each motif part as such is printed over a suitable width dimension.

According to a second possibility, printing units 32 with fixed printing widths are used, and by the control, exclusively a suitable centering is provided. This technique has the advantage that possibly printing units can be used with a printing width that is not alterable as such, thus, for example, with printing cylinders, too.

It is clear that when using different colors, multiple portions of printing units can be placed one after the other, which then all are controlled synchronously.

Although the invention has been described above by means of a tile motif, it is clear that it does not only show its advantages with such motifs, but that it can be applied for all laminate applications wherein an uncontrolled stretching leads to deviations from the desired result.

Figure 13:
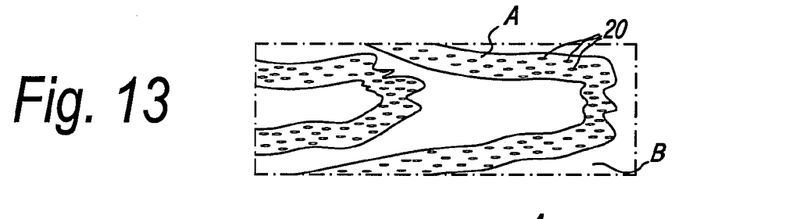
FIGS. 13, 14 and 15 relate to a printed wood motif with impressed pores.
Figure 14:
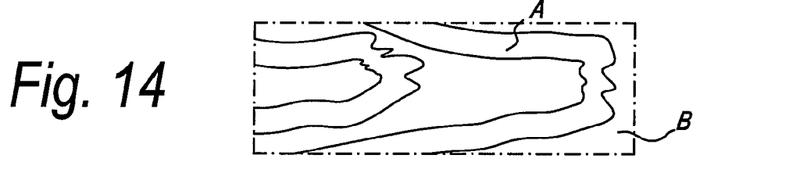
Figure 15:
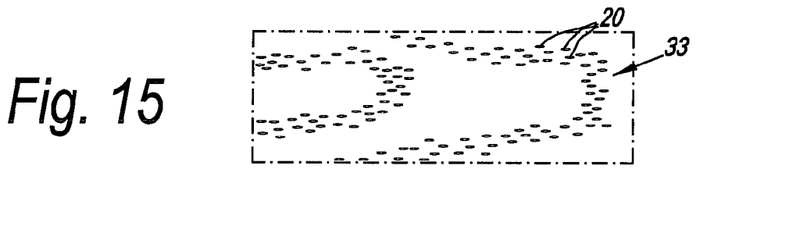

For illustrating this, FIGS. 13 to 15 represent another application of a laminate product with a wood motif.

FIG. 13 represents the finished decorative side with a printed image with zones A, which are of another color tint than the zones B, wherein in the zones A impressions 20 are formed imitating the pores of the wood. FIG. 14 shows the decor alone, whereas FIG. 15 represents the motif of the impressions 20 as such, which thus also is a representation of the applied relief pattern 33. From this, it is clear that, when the decor after the resin application should no longer be in accordance with the motif, never the effect of FIG. 13 is obtained. More particular, it is then known that hazy undesired effects would occur.

Figure 16:
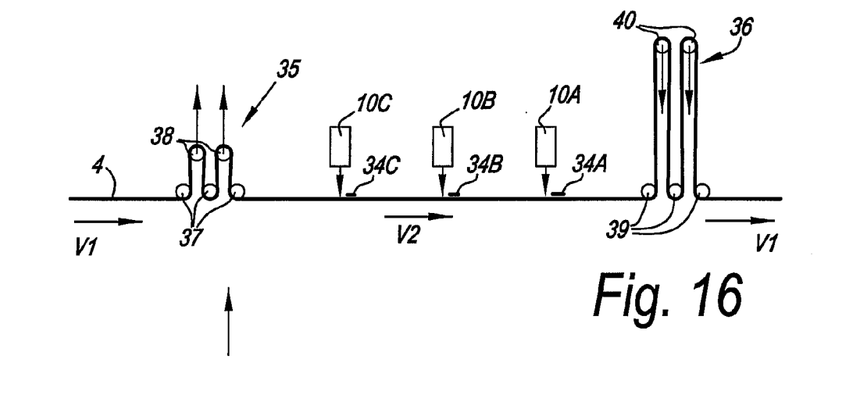
FIGS. 16, 17 and 18 schematically represent printing a decor carrier, in accordance with, amongst others, the fourth and fifth aspect of the invention.
Figure 17:
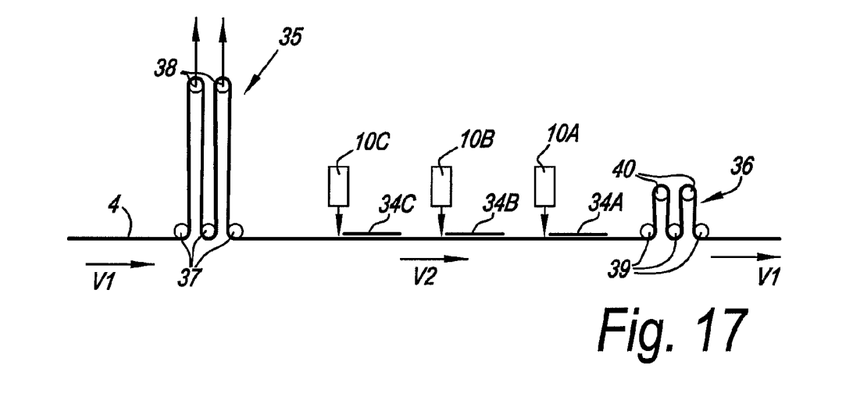
Figure 18:
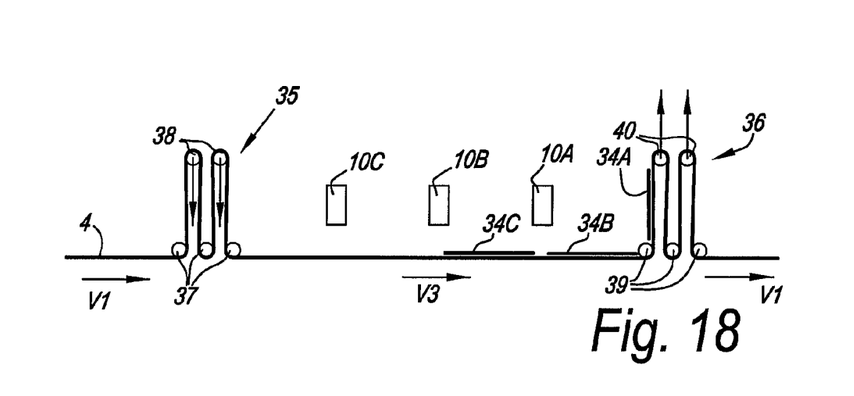

Finally, in FIGS. 16 to 18 a special technique is represented for printing a decor sheet 4, which can be advantageously applied when realizing the method according to the first aspect of the invention, but which, however, also forms an example of, amongst others, the fourth and fifth independent aspects of the invention.

Herein, the decor carrier 4 is moved forward at a certain nominal passage speed V1. This means that the supply as well as the discharge of the decor carrier 4 is performed at said speed V1. The particularity herein is, however, that the passage speed V2, at which the decor carrier 4 is moved forward during the actual application of the decor 5, is lower than said nominal passage speed V1; that, when actually applying the decor 5, an excess surface is provided with a decor, in other words, a larger surface is provided with decor 5 than in the case that the decor 5 would be applied at the speed V2; and that the application of the decor 5 is performed in intervals and between these intervals each time an advance movement is performed at the increased speed V3.

In order to realize this, in the represented example multiple printing devices arranged one after the other, in this case three, 10A, 10B and 100, respectively, are applied, which each realize their own decor portions or decor segments 34A, 34B and 34C. Before and after this group of printing units, there are buffer systems 35 and 36, which allow to compensate and/or to cause the differences between the speeds V1, V2 and V3, which systems in the represented example consist of displaceable rollers 37-38 and 39-40 forming systems by which the path to be followed by the material web systematically can be increased and reduced. The operation can simply be deduced from the successive working conditions represented in the FIGS. 16, 17 and 18.

In the condition of FIG. 16, the decor carrier 4 is supplied at a speed V1. The rollers 37 and 38 mutually are displaced away from each other, with the result that the decor carrier 4 exits the buffer system 35 at a lower speed V2. The printing devices 10A, 10B and 100 then successively apply the respective decor segments 34A, 34B and 34C on the decor carrier. In order to obtain that the decor carrier can be discharged at the speed V1, more material is taken from the buffer system 36 than is supplied thereto, for which purpose the rollers 39 and 40 are displaced towards each other.

FIG. 17 shows the condition at the moment when the decor segments 34A, 34B and 34C are realized practically completely.

After the decor segments 34A, 34B and 34C are realized completely, the printed portion is rapidly shifted on at an increased speed V3, wherein, in order to retain the speeds V1 at the inlet and the outlet, the buffer systems 35 and 36 are controlled in a suitable manner by bringing the rollers 37-38 towards each other and moving the rollers 39-40 away from each other.

It is clear that the mutual displacement between the rollers 37 and 38, as well as between the rollers 39 and 40, will take place by means of suitable drive and/or transmission means in order to provide, in function of the aimed at cycle, an elongation, shortening, respectively, of the path to be followed, the construction of said means being within the range of those skilled in the art. It is also clear that bending rods can be used instead of rollers. Other buffer systems are possible, too.

From the embodiment of the invention described above by means of FIGS. 16 to 18, it is clear that the local passage speed V12 at the height of the printing devices 10A, 10B and 100 will be considerably lower than the general passage speed V1, which offers the advantage that now also printing devices can be used which as such print relatively slow, whereas still a higher general passage speed remains possible. Hereby, a practical solution is offered for applying digital printers, such as digital inkjet systems, the speed of which mostly is relatively limited, without having to restrict the general passage speed to the operational speed of such digital printer. It is clear that such system thus is advantageous for being applied with the first aspect of the invention, wherein then, for example, the printing device 10 from FIGS. 2 to 5 is replaced by an arrangement such as in FIGS. 16 to 18 with, for example, digital printers. The digital printers then allow an easy control by means of the feedback, whereas the arrangement with multiple printers 10A, 10B and 10C allows that the printed decor sheet can be fed through the resin application device at a speed V1 which is higher than V2. In this manner, the speeds V2 and V1 each can be optimized in function of the respective treatment, in this case, printing and providing with resin, respectively.

It is noted that the printing devices mentioned in all aspects of the invention, as such may consist of multiple printing units, wherein these printing units preferably are independently controllable. Such independent control is particularly interesting for the compensation of stretching occurring as a result of the resin application process, such as discussed above by means of FIG. 12, as it is possible that such stretching will not manifest itself uniformly over the width of the decor sheet. So, for example, the decor application process may be performed of multiple digital printing units arranged adjacent to each other, possibly in a staggered manner. It is not excluded that the printing units arranged adjacent to and/or staggered behind each other in such example perform a partially overlapping print or perform a print separated by an unprinted portion. Preferably, a battery of printing units is used, which is at least able to print the entire width of the desired decor. For an example of said staggered arrangement of printing units, again reference is made to the printing units 32 of FIG. 12.

Further, it is noted that such printing unit, as also mentioned above, as such can comprise several printing heads or other portions, for example, in that multiple primary colors, such as cyan, magenta, yellow and possibly black, are used. Such portions of printing units then can be positioned one after the other and be controlled in register or synchronous, such that the print images of different color can be provided on top of each other in a sufficient manner. In order to obtain a good accordance among the different print images, for example, marks can be applied, which are provided by one or more of the printing heads and are used as a reference by at least one printing head.

When working with printing units having a to and fro moving printing head, the decor sheet, or at least the portion of this decor sheet that is being printed, preferably is moved intermittently through the printing device. Possibly, then also the resin application process, or a portion thereof, is performed while the decor sheet to be impregnated is moving intermittently. Preferably, however, care is taken that in the resin application process or a portion thereof, the decor sheet indeed is moving continuously. This may be obtained, for example, by providing a buffer between the decor application process and the respective portion of the resin application process.

When so-called single-pass printing units are used, then preferably printing heads standing still are used. In such case, the decor sheet may perform a continuous movement through the printing unit, wherein the speed indeed may be lower than the speed of the decor application process. However, this speed difference can be counteracted, for example, by applying the measures described by means of FIGS. 16 to 18.

The present invention is in no way limited to the embodiments described by way of example and represented in the figures; on the contrary, such method for manufacturing floor panels, as well as the floor panels obtained thereby and the devices applied for this purpose, can be realized according to various variants, without leaving the scope of the present invention.

The invention claimed is:
1. Method for manufacturing a laminate product comprising at least a laminate layer, comprising the steps:
for forming the laminate layer, forming at least a decor sheet by providing in a decor application process a decor in the form of a motif on a decor carrier;

then providing the decor sheet with resin using a resin application process;

wherein said decor application process and said resin application process are performed in-line with each other;

wherein a deformation occurs in the decor carrier in the form of stretching as a result of the resin application process, and wherein the decor application process is carried out in a controlled manner such that the decor is applied on said decor carrier as a function of said deformation;

using a feedback, wherein after the resin application the dimensions and/or the location of the decor are detected, and wherein the decor application process is controlled such that the dimensions and/or the location of the decor are altered as a function of the feedback; and wherein the decor carrier has a width direction and a length direction and wherein, when applying the decor, at least deformation in the width direction is taken into account.

2. The method of claim 1, wherein the laminate product is provided on its surface with a predetermined relief pattern in accordance with the decor; and wherein the decor during the decor application process is applied as a function of the occurring deformation so that the decor, following deformation, is adapted to said predetermined relief pattern.

3. The method of claim 1, wherein the decor carrier has a width direction and a length direction and wherein, when applying the decor, at least deformation in the length direction is taken into account.

4. The method of claim 1, wherein for applying the decor, a printing unit is arranged to apply the motif of the printed decor and is controlled instantaneously, and wherein the control of the decor application process enables altering the motif.

5. The method of claim 4, wherein altering the motif comprises the step of printing on the decor carrier the respective motif, or portions thereof, in a stretched manner.

6. The method of claim 4, wherein, by the control of the decor application process, the mutual location of certain motif parts of the decor is adapted when applying the decor.

7. The method of claim 1, wherein the decor is applied on the decor carrier by means of at least one digital printing device or digital printing unit.

8. Device for carrying out the method of claim 1, comprising a decor supply supplying a decor carrier and a resin application line arranged in-line therewith, said line comprising at least of an applicator providing resin in liquid condition on the decor carrier and a drying device; and a printing device between said decor supply and the applicator, arranged to provide the decor on the decor carrier.

9. The device of claim 8, wherein said printing device is arranged to adapt to the decor width, in its totality and/or by altering the location of portions thereof; wherein the device is provided with a measuring device controlling at least certain deformations in the decor, and wherein the printing device comprises a feedback by which the printing device is controlled as a function of values originating from the measuring device.

10. A method for manufacturing a laminate product comprising at least a laminate layer, said method comprising the steps of:
for forming the laminate layer, forming at least a decor sheet by providing in a decor application process a decor in the form of a motif on a decor carrier having a width direction and a length direction;

then providing the decor sheet with resin using a resin application process;

wherein said decor application process and said resin application process are performed in-line with each other;

wherein a deformation occurs in the decor carrier in the form of stretching as a result of the resin application process, and wherein the decor application process is carried out in a controlled manner by a printing unit arranged to apply the motif of the printed decor such that the decor is applied on said decor carrier as a function of said deformation; and using a feedback including the dimensions and/or the location of the decor detected after the resin application process by a measuring device to instantaneously control the decor application process as a function of the feedback, such that the control of the decor application process enables altering the motif by printing on the decor carrier the respective motif, or portions thereof, in a stretched manner corresponding at least to the deformation of the decor carrier in the width direction.

11. Method for manufacturing a laminate product comprising at least a laminate layer, comprising the steps:
for forming the laminate layer, forming at least a decor sheet by providing in a decor application process a decor in the form of a motif on a decor carrier having a width direction and a length direction;

then providing the decor sheet with resin using a resin application process;

wherein said decor application process and said resin application process are performed in-line with each other;

wherein a deformation occurs in the decor carrier in the form of stretching as a result of the resin application process, and wherein the decor application process is carried out in a controlled manner by a printing unit arranged to apply the motif of the printed decor such that the decor is applied on said decor carrier as a function of said deformation; and using a feedback including the dimensions and/or the location of the decor detected after the resin application process by a measuring device to instantaneously control the decor application process as a function of the feedback, wherein the control of the decor application process enables altering the motif such that a mutual location of certain motif parts of the decor is adapted as a function of the stretching when applying the decor.

* * * * *